United States Patent [19]
Fett

[11] 4,120,099
[45] Oct. 17, 1978

[54] APPARATUS FOR TRAINING THE TELECONTROL OF A MODEL HELICOPTER OR THE LIKE

[76] Inventor: Helmut Fett, Lovenicher Weg 15, 5000 Cologne 41, Fed. Rep. of Germany

[21] Appl. No.: 783,281

[22] Filed: Mar. 31, 1977

[30] Foreign Application Priority Data

Mar. 31, 1976 [DE] Fed. Rep. of Germany ....... 2613734

[51] Int. Cl.² .............................................. G09B 9/08
[52] U.S. Cl. ................................. 35/12 K; 35/12 L; 46/75; 46/77; 272/31 B
[58] Field of Search ............... 35/12 K, 12 L, 12 P; 46/1 H, 77, 78, 75; 272/1 C, 31 B

[56] References Cited

U.S. PATENT DOCUMENTS 3,548,518 12/1970 McRae ............................... 35/12 L

Primary Examiner—William H. Grieb

[57] ABSTRACT

This disclosure is directed to an apparatus for training a person to remotely control a powered model helicopter and includes from top to bottom an assembly plate, an upper plate, a frame and a base plate with a plurality of supports supporting the frame from the base plate, a generally upright telescopic support carried by the base plate and passing through apertures of the frame and upper plate, and a universal joint connection between an upper end portion of the generally upright telescopic support and the assembly plate whereby a powered helicopter secured to the assembly plate is capable of roll, yaw and pitch motions which can be controlled by conventional remote controls to train a person to control the model helicopter.

23 Claims, 11 Drawing Figures

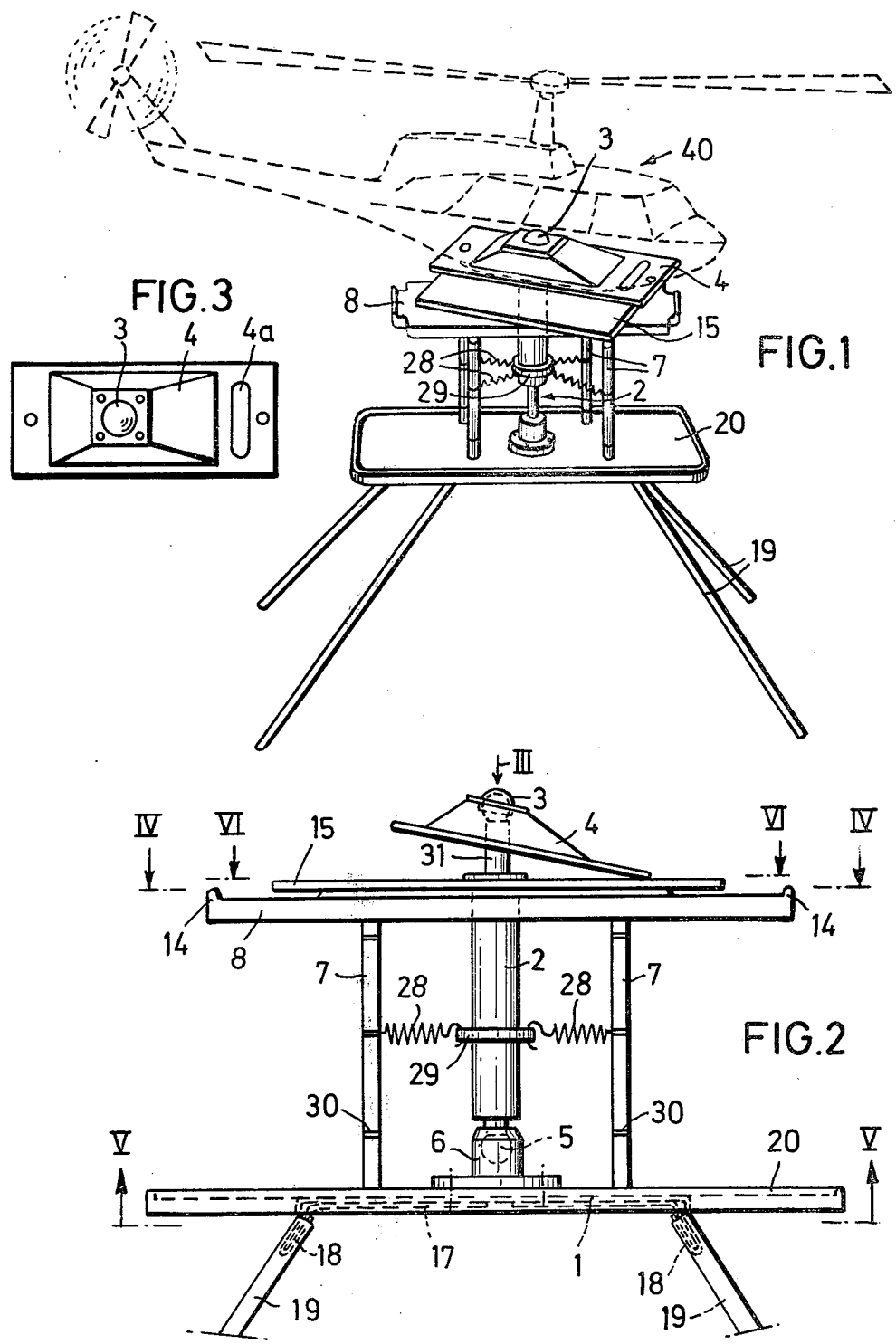

APPARATUS FOR TRAINING THE TELECONTROL OF A MODEL HELICOPTER OR THE LIKE

The present invention is directed to a novel apparatus for training a person to remotely control a model helicopter or the like.

The safe control of a remotely controlled model helicopter while in flight, particularly, when doing acrobatics, is extremely difficult for neophytes or beginners because a helicopter performs eight different phases of movement which must frequently be controlled simultaneously. A helicopter (model or real) may turn to the left or to the right, tilt about the rotor axis to all sides, fly forward and backward, and raise and lower. These different movements must be controlled by the model aviator so that the resulting flight curve is even or uniform and the helicopter, obviously, does not tumble, tilt or crash. It is necessary to engrain into the subconscious of the learner the various movements of the control switch of the remote control box such that when the helicopter is in free-flight the now-trained learner can make appropriate switch lever movements without deliberation and as a reflex action, no matter what the particular disposition of the helicopter with respect to the person flying the same, i.e., whether the helicopter is flying away from or toward the controller, etc.

Up to the present, one simply trained himself to fly a model helicopter in free-flight more often than not resulting in crashes which, obviously, caused considerable expense and time for repairs, not to mention the cost of spare parts. Obviously, additional time must be expended in order that the model may be repaired for subsequent launching and flight, and from a psychological standpoint with each new launch attempt, the learner feels more apprehensive because of the knowledge of his previous errors. The result is that a normally pleasurable hobby becomes a stress and at times the hobby is simply abandoned.

In view of the foregoing, it is a primary object of the present invention to provide a novel apparatus which permits a learner or neophyte to correctly learn how to remotely control a powered model helicopter without the risk of crash-landings.

The latter object is achieved by providing a generally upright telescopic support at an upper end portion of which is carried by a universal joint an assembly plate to which is fixed the model helicopter, and through appropriate additional plates and supports the helicopter when under power and secured to the assembly plates is capable of roll, yaw and pitch motions which can be remotely controlled yet crashing cannot occur.

In keeping with the present invention, the apparatus restrains a powered model helicopter from flying away when under power, yet it allows simulated flight closely matching actual flight conditions. Due to the telescopic nature of the upright support the helicopter may rise or lower under suitable control by the learner while the universal or ball-and-socket joint at the upper end portion of the upright telescopic support permits free rotation of the model helicopter through 360° to change direction as well as to permit the helicopter to tip or incline about its vertical axis. Thus, all three motions (roll, yaw and pitch) are permitted yet such occurs while the model helicopter is restrained partially and is not in uncontrolled free-flight. In this manner, the powered model helicopter may be operated as close to reality as possible, and guided in a safe manner such that the learner or novice model aviator need not concern himself with his initial clumsiness which might otherwise cause crashing of an untethered free-flight powered model helicopter. In this manner, the reflexes of the model aviator may be trained to perfection and only then need the model be flown in free-flight. In addition, the apparatus is so-constructed that apart from being utilized as a training apparatus, the device may be used for the riskless setting of various mechanisms thereof including the motor, the trimming of the rotor plane, and other adjustments which are important for tracking purposes and in this case, the apparatus is, in effect, an inspection platform.

A further object of this invention is to provide a novel apparatus of the type heretofore set forth in which an upper plate is sandwiched between the assembly plate and the base plate, the upper plate being dimensioned to simulate a helicopter landing pad and includes an aperture therein through which passes the generally upright telescopic support whereby motion imparted to the telescopic support is also imparted to the upper plate or simulating lift-off and landing upon the upper plate or helicopter pad. Thus, the upper plate serves as a take-off and landing ramp for the model helicopter and, thus, simulates a like actual pad when the model helicoptor is used eventually in free-flight.

In further keeping with this invention, another object thereof is that of forming the generally upright telescopic support as a sleeve, preferably of plastic material, which telescopically receives a rod, preferably of steel, with means being provided to adjustably set the relative maximum and/or the minimum retraction and extension motions thereof. An end portion of the rod which is received in the sleeve carries a guide member to assure coincidence of the axis of the sleeve and rod, thus, to eliminate stresses and ensure accurate vertical lowering or lifting of the powered model helicopter.

In one embodiment of the invention, a lower end portion of the upright telescopic support is immovably connected to a base plate and in this embodiment, lateral oscillation of the model to simulate hover flight is not permitted. However, in accordance with another embodiment of the invention, such lateral oscillation of the model helicopter can be realized by providing a lower end portion of the upright telescopic support with a universal joint or ball-and-socket joint relative to the base plate. Preferably, in this embodiment of the invention, a frame or a frame plate is disposed between the upper plate and the base plate and the frame is supported above the base plate by a plurality of generally vertical elongated support members. The frame or frame plate has a centrally located generally circular aperture the diameter of which corresponds approximately to the dimensions of the base plate. The purpose of the circular aperture is to permit the upright telescopic support to oscillate laterally but only within the confines of the aperture and, thus, in accordance with this embodiment, all phases of flight movement of a model helicopter can be simulated.

In further keeping with this invention, the upper plate rests loosely upon the frame and since the upright telescopic support passes through an aperture of the upper plate, any oscillation of the upright telescopic support is imparted to the upper plate, thus, the circular aperture of the frame not only limits the oscillation of the upright telescopic support, but also the oscillation of the upper plate. Obviously, since the skids of model helicopters differ, the upper plate since it is loosely received by the upright telescopic support and is unconnected to the frame may be removed and replaced by various differently configured plates depending upon the skids of the model helicopter involved.

In further keeping with this invention, the frame or frame plate includes a circular or annular bead surrounding the circular aperture thereof and a like bead at opposite edges of the frame with the latter beads being of the same height. The upper plate rests freely on these beads so as to keep as low as possible the friction resistance between the upper plate and the frame such that lateral motion of the upper plate relative to the frame is not impeded.

In further keeping with this invention, the elongated supports between the frame and base plate may be in the form of tubes enclosing threaded rods which are threaded into apertures of the frame and pass through apertures of the base plate as well as apertures of a table plate overlying the base plate and the components thus, assembled may be secured together by nuts. By this construction, the apparatus may be relatively quickly assembled and disassembled preferably to convert the basic apparatus which is designed primarily as a training aid through an apparatus utilized as an inspection or repair table.

A further object of this invention is to provide at least 3 but preferably 4 tension springs one end of each of which is secured to a ring through which passes the upright telescopic support while opposite ends of the springs are secured to the elongated support members. Under normal conditions, the tension in the springs maintains the upright telescopic support generally perfectly vertically yet when the helicopter is under power the tension in the springs is such that oscillation of the upright support is achieved. Furthermore, the elongated support members are provided with vertically spaced peripheral grooves into which hook-shaped ends of each spring can be snap-secured. By this arrangement, the springs may be adjusted vertically upwardly or downwardly between the base plate and the upper plate. When in an uppermost position, the springs apply maximum tension to the upright telescopic support and when in a lower position the tension is at a minimum, thus, permitting lesser and greater oscillation of the powered helicopter, respectively.

The upper spring position is recommended for beginners which should practice guiding first without the hover-flight phase and with limited oscillation about a vertical axis. In the course of training, the springs may be displaced downwardly in a step-wise fashion until the full radius of oscillation of the upright telescopic support is achieved as limited by the circular aperture of the frame heretofore described.

In further keeping with this invention, the sleeve of the upright telescopic support is disposed uppermost and secured to a closure plug thereof is a threaded rod carrying a ball forming a portion of the universal joint connected to the assembly plate. Thus, when it is desired to remove a particular assembly plate, the rod, which is connected to the plug of the sleeve is simply unthreaded therefrom and the rod and assembly plate are put aside and another differently contoured or sized assembly plate and its associated threaded rod are then re-assembled to the sleeve by threading the new threaded rod into the threaded closure plug of the sleeve. In this manner, different assembly plates can be rapidly interchanged with the sleeve to accommodate the models having skids of different widths and/or lengths, etc.

In further keeping with this invention, the lower universal joint which unites the rod which is telescopically received in the sleeve to the base plate does so through a generally upwardly opening cup-shaped member having an inwardly directed flange and an upwardly facing inclined edge which is inclined at an angle of approximately 45° to the horizontal. The latter-noted angle limits the oscillation or tilting of the upright telescopic support to approximately 45°.

In further keeping with this invention, the upper universal joint may be constructed otherwise than that described, namely, by providing a threaded rod carrying a ball which is received in the sleeve and which rests against a suitable seat therein, and spring means surrounding the rod between a cap of the sleeve and the assembly plate to which the rod is connected thereby continuously biasing the assembly plate away from the sleeve closure and in effect, at all times, biasing the ball internally of the sleeve against the seat therein.

In further keeping with this invention, a plurality of feet may be provided for supporting the base plate and preferably these are removably secured to the base plate through folded feet of rods secured to the latter.

Upon removing the upright telescopic support, the upper plate and the assembly plate, the feet position the frame at a height which serves as an inspection or repair table and for such utilization it is advantageous to provide the frame at four corners thereof, with apertures through which hold-down springs may be utilized to clamp the skids of a model helicopter against the frame such that the model helicopter is readily secured to the frame for inspection and/or repair.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a prospective view of a novel apparatus constructed in accordance with this invention and illustrates in phantom outline a model helicopter resting atop an assembly plate supported atop an upright telescopic support by a universal joint with a lower end portion of the telescopic support being connected by a universal joint to a base plate.

FIG. 2 is a side elevational view of the apparatus of FIG. 1 and additionally illustrates a plurality of supports between the base plate and a profile frame as well as an upper plate between the assembly plate and the profile frame.

FIG. 3 is a view taken along line III of FIG. 2, and illustrates details of the assembly plate.

Figure 7:
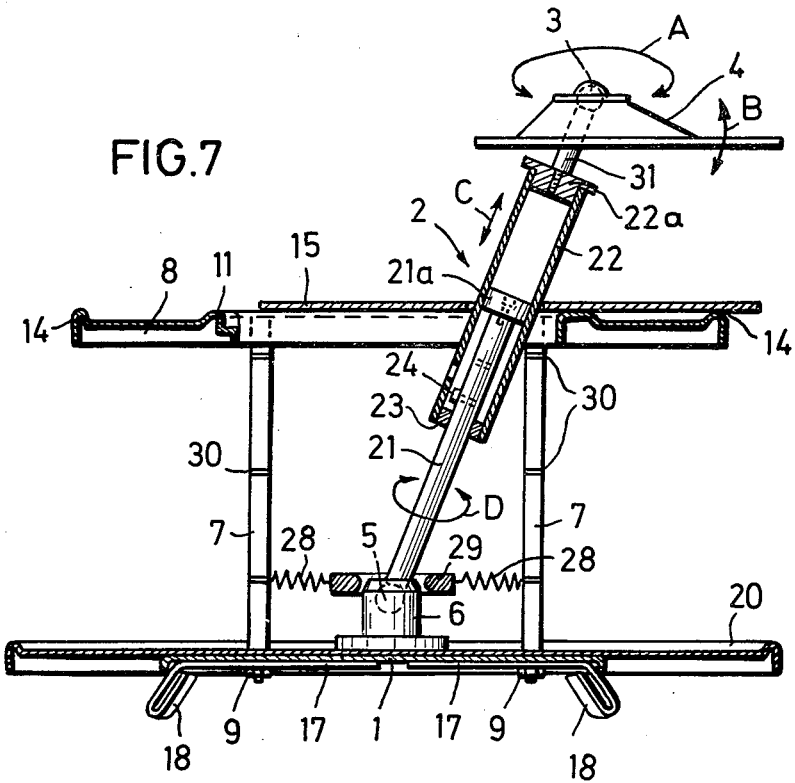
FIG. 7 is a partial sectional view of the apparatus of FIG. 2, and illustrates the upright telescopic support in partial extended condition with cooperative adjustable stop means for limiting the relative extension between a sleeve and rod of the telescopic support.
Figure 8:
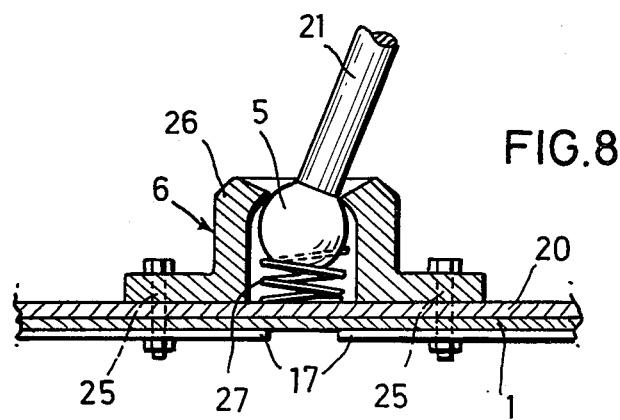
FIG. 8 is an enlarged cross-sectional view of a lower universal or ball-and-socket joint, and illustrates a spring biasing a ball against an inwardly directed flange of a generally cup-shaped member.

A novel apparatus constructed in accordance with this invention for training a novice model aviator to remotely control a powered model helicopter is best illustrated in FIGS. 1, 2 and 7 of the drawings and includes a base plate 1 (FIGS. 2 and 7) upon which is supported a generally upright telescopic support 2 having upper and lower end portions (unnumbered). The upper end portion carries a spherical part (unnumbered) or ball of a universal joint or ball-and-socket joint 3 formed in part by a recess portion (unnumbered) of an assembly plate 4. The assembly plate 4 is adapted to have secured thereon a model powered remote controlled helicoptor 40, as indicated in phantom outline in FIG. 1. The upright telescopic support 2 includes at its lower end portion a universal or ball-and-socket joint 5 which is composed of a ball 5 (FIG. 8) received in an upwardly opening generally tubular cup or flange 6 appropriately secured to the base plate 1 and a cover or table plate 20 by nuts and bolts 25. An upper edge 26 of the flange 6 is directed radially inwardly and an uppermost face thereof (unnumbered) is inclined at an angle of approximately 45° to limit the tilting of the generally upright telescopic support 2 to 45°. A spring 27 biases the ball 5 upwardly against the flange 26 in the manner readily apparent from FIG. 8.

Figure 4:
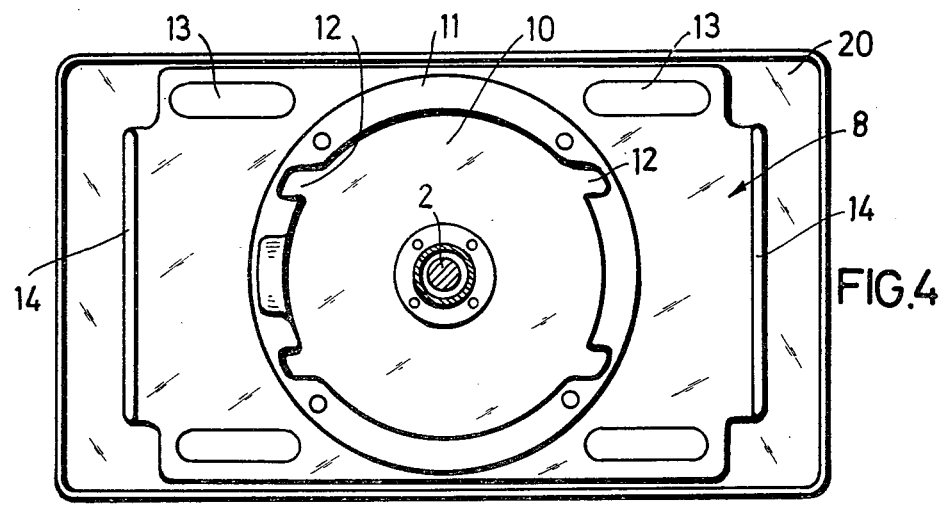
FIG. 4 is a top plan view taken generally along line IV—IV of FIG. 2, and illustrates a circular aperture in the profile frame as well as an annular upstanding bead surrounding the same and upstanding beads at opposite edges thereof.
Figure 5:
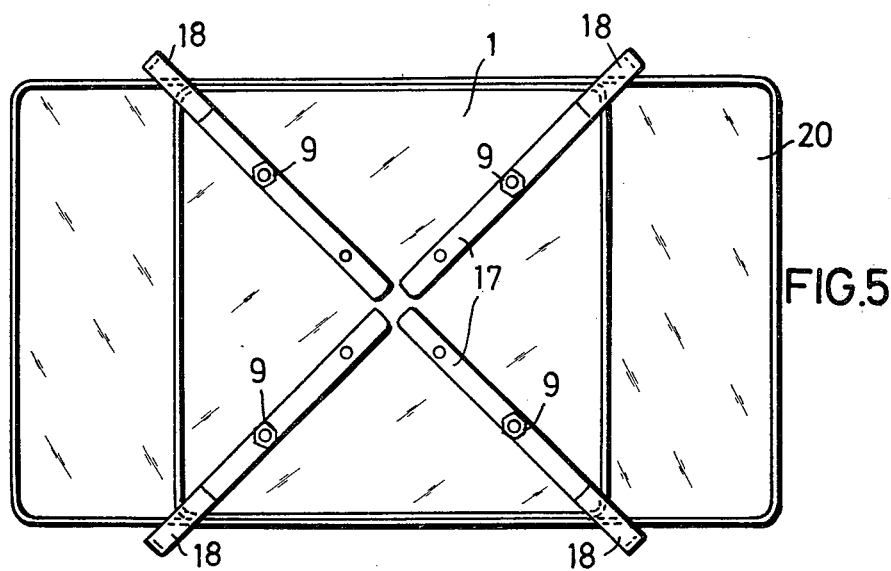
FIG. 5 is a bottom plan view taken along line V—V of FIG. 2 and illustrates the manner in which a plurality of metal strips are secured to the base plate for receiving supporting legs.

Four vertical elongated supporting members 7 formed as tubes receiving at opposite ends threaded rods (not shown) connect the base plate 1 with a profile frame, frame or frame plate 8 and the threaded rods at the lower ends of the members 7 are secured under the base plate 1 by nuts 9 (FIG. 5). The frame 8 includes a generally central circular aperture 10 (FIG. 4) surrounded by an annular upwardly directed bead 11, the diameter of which is approximately that of the dimensions of the base plate 1. Four slots or cut-outs 12 are provided in the periphery of the aperture 10 and in the vicinity of the cut-outs 12, each corner of the frame 8 is provided with a slot or opening 13. Two opposite edges (unnumbered) of the frame 8 are provided with upwardly directed beads 14, the height of which corresponds to the height of the annular bead 11 surrounding the circular aperture 10.

Figure 6:
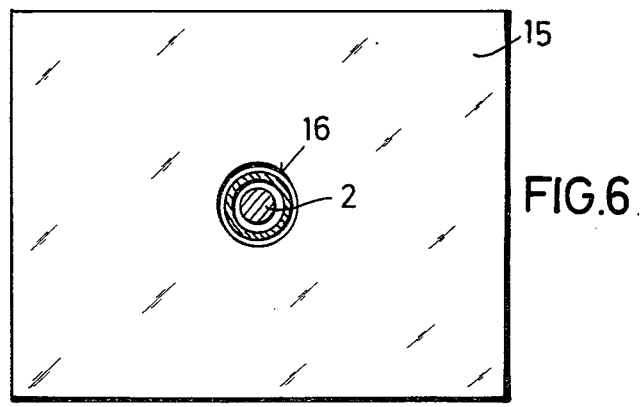
FIG. 6 is a top plan view taken along line VI—VI of FIG. 2, and illustrates the configuration of the upper plate and the manner in which the same loosely surrounds the upright telescopic support.

A smooth upper plate 15 having a central aperture or opening 16 (FIG. 6) rests freely on the frame 8 and the telescopic support 2 passes through the opening 16. The opening 16 is slightly larger than the diameter of the telescopic support 2 (FIG. 6) and the peripheral dimension of the upper plate 15 is designed to accommodate the length of and spacing between the skids of a particular model remote controlled powered helicopter.

Beneath the base plate 1 are a plurality of metal strips 17 (FIGS. 2, 7 and 5) which radiate generally from the center of the base plate 1 and are secured to the latter by the threaded rods of the supports 7 and the nuts 9 associated therewith. The metal strips 17 each end in an overfolded foot 18 inclined in the manner illustrated best in FIGS. 2 and 7 which are telescopically inserted into tubular legs 19. The legs 19 are of a suitable height to bring the overall apparatus to a practical working position but preferably of a sufficient height in order that the rotor (unnumbered) of the helicopter 4 is sufficiently high above the ground so that persons are not endangered thereby when the model helicopter is under power.

The threaded rods (unnumbered) carried by the elongated supporting members 7 also pass through apertures (unnumbered) of a table plate 20 which rests atop the base plate 1 in the manner best illustrated in FIGS. 5 and 7. Preferably the assembly plate 4, the frame 8, and the table plate 20 are formed from impact-resistant plastic while the base plate 1 is made of metal having flexural strength. The upper plate 15 is preferably constructed from wood.

Reference is now made to FIG. 7 of the drawing which illustrates the specific construction of the telescopic support 2. The telescopic support 2 includes a steel rod 21 and a sleeve 22 in which the rod 21 can move in a telescopic manner as is readily apparent from the latter Figure. The sleeve 22 is preferably constructed of plastic material. The maximum length of extraction of the rod 21 relative to the sleeve 22 is adjusted by means of stops 23, 24. The stop 24 is a transverse screw which is threaded into predetermined threaded bores (unnumbered) of the rod 21 while the stop 23 is a guide ring or plug which is fixed to the sleeve in a conventional manner. The rod 21 at its upper end portion (unnumbered) carries a cylindrical guide member 21a which in conjunction with the bore (unnumbered) of the stop 23 assures coincidence between the axis of the rod 21 and the sleeve 22.

The lower ball joint or universal joint 5 permits a circulatory or oscillatory movement of the telescopic support 2 limited both by the 45° upper face of the flange 26 and the opening or aperture 10 of the frame 8. In conjunction with this oscillatory motion of the telescopic support 2, there is provided a plurality of tension springs 28 which engage at one end a ring 29 and at an opposite end carry hooks (unnumbered) which engage in any one of a plurality of vertically spaced grooves 30 formed in the elongated supporting members 7. When the springs 28 are hooked in the lowermost grooves 30 (FIG. 7) the telescopic support 2 has unlimited oscillatory freedom but as the springs 28 are raised upwardly from the position shown in FIG. 7 to, for example, the position shown in FIG. 2, the springs 28 resist oscillatory motion of the telescopic support 2. Thus, the higher the springs 28 are positioned, the more difficult it is for the telescopic support 2 to oscillate about a vertical axis. The purpose of this is to permit a beginner to utilize the apparatus with the springs 28 in the uppermost grooves 30 so that oscillatory motion is limited and as the beginner becomes more proficient, the springs 28 may be progressively lowered until unlimited oscillatory motion is achieved except, of course, as it is limited by the aperture 10 of the frame 8.

In order to permit various assembly plates to be secured to and removed from the sleeve 22 depending upon the length of and distance between the skids of an associated model helicopter, the assembly plates 4 are preferably carried by a threaded rod 31 (FIG. 7) which is threaded into a threaded bore (unnumbered) of a closure plug 22a fixed to the sleeve 22. In this manner, the threaded rod 31 can be unthreaded to remove both the rod 31 and the assembly plate 4 and another assembly plate and its associated threaded rod may be reintroduced or reassembled to the closure plug 22a. Preferably the helicopter 40 is secured to the assembly plate 4 by rubberbands or the like.

In order to train the reflexes of a beginner or beginning model aviator, the remote controlled powered helicopter 40 is secured to the assembly plate 4 in the manner shown in FIG. 1 and the springs 28 along with the ring 29 are placed into the uppermost grooves 30 of the elongated supporting members 7 in order that the telescopic support 2 may oscillate laterally or about its vertical axis only slightly. The engine or motor of the helicopter 40 is then started by, for example, a power transmission belt projecting through a slot 4a in the assembly plate. By utilizing the conventional control box or control panel, the model 40 is so controlled that it may turn about the upper ball joint 3, tilt thereabout, and lift and lower by the extension or shortening of the rod 21 relative to the sleeve 22 with each of these motions being indicated by the respective double-headed arrows A, B and C in FIG. 7. Once the rudimentary phases of the helicopter motions have been sufficiently absorbed by the beginner, the springs 28 and the ring 29 may be dropped to the next lower grooves 30 of the elongated supporting members 7 so that the degree of oscillation of the telescopic support 2 may be increased and, in addition thereto, the hover-flight can be additionally trained. The oscillatory or circulating axis is indicated by the double-headed arrow D in FIG. 7. With this, yaw, roll and pitch is permitted by the apparatus of this invention.

It is to be particularly noted that during all oscillatory motion of the telescopic support 2, the upper plate 15 is moved thereby due to the passing of the sleeve 22 through the aperture 16 of the plate 15. Furthermore, the motion of the upper plate 15 is not impeded and is, in fact, augmented due to minor friction achieved by the beads 11 and 14. During the training phase, it is desirable for the learner to position the telescopic support perfectly vertically at which time the upper plate 15 will be centered over the aperture 10 and at this point the helicopter should be brought down perfectly vertically to simulate landing upon a landing pad or ramp.

Figure 9:
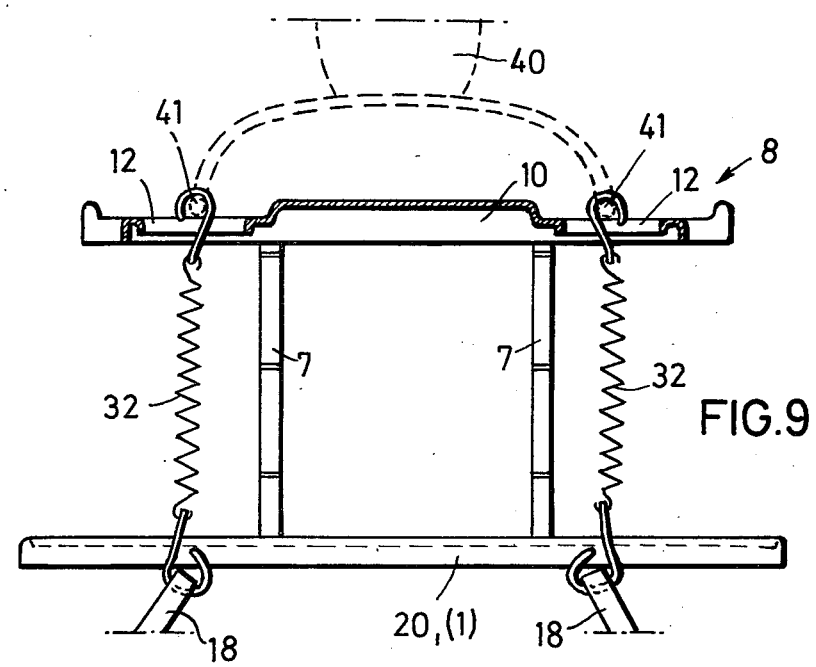
FIG. 9 is a side view of the apparatus of FIG. 1 after the removal thereof of various of the components, and illustrates the manner in which a plurality of springs are utilized to hold a helicopter shown in phantom outline upon the profile frame for inspection and/or repair.

Reference is now made to FIG. 9 of the drawings which illustrates the apparatus after all of the components have been removed except for the base plate 1, the table plate 20, the elongated supporting members 7, and the frame 8. When, thus modified, the apparatus serves as an inspection or maintenance table, and suitable tension springs 32 may be passed through the slots 12 of the frame 8 and engaged over skids 41 of the model helicopter 40 to secure the same to the frame 8. Opposite ends (unnumbered) of the springs 32 may be suitably connected to the feet 18 of the base plate 1. In this manner, the helicopter 40 is secured to the frame 8 and maintenance can be performed unimpededly, particularly, through the opening 10 in the frame 8 even when the motor or engine of the helicopter is running or under power.

Figure 10:
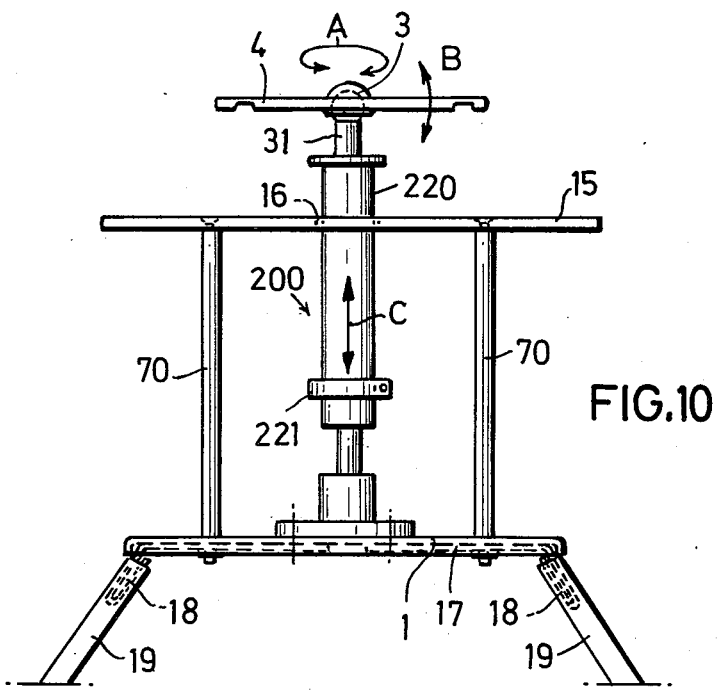
FIG. 10 is a side elevational view of another embodiment of this invention, and the latter differs primarily from that first described in that a rod of the upright telescopic support is fixed immovably to a base plate.

Reference is now made to FIG. 10 of the drawings, which illustrates a simplified version of the present invention. In the embodiment of the invention illustrated in FIG. 10, the upper plate 15 is directly bolted to a plurality of elongated supporting members 70 fixed to the base plate 1 just as in the manner heretofore described. A telescopic support 200 corresponds substantially to the telescopic support 2, except that the lower ball joint or universal joint of the latter is substituted for by a stationary connection (unnumbered) and, thus, the lengthening and shortening as indicated by the double-headed arrow C occurs only in a pure vertical direction without oscillation. A sleeve 220 carries the same threaded rod 31, universal joint 3 and assembly plate 4 as that heretofore described. The latter construction permits movement as indicated by the double-headed arrows A and B. In order to limit motion of a sleeve 220 of the telescopic support 200 relative to its rod (unnumbered) a clamping ring 221 which may be adjusted along the length of the sleeve 220 will abut a lower face (unnumbered) of the plate 15. By this adjustment, the height of flight of the powered helicopter can be observed so that the model may be held in any particular hovering distance above the plate 15 as limited by the full extension of the sleeve 220.

Figure 11:
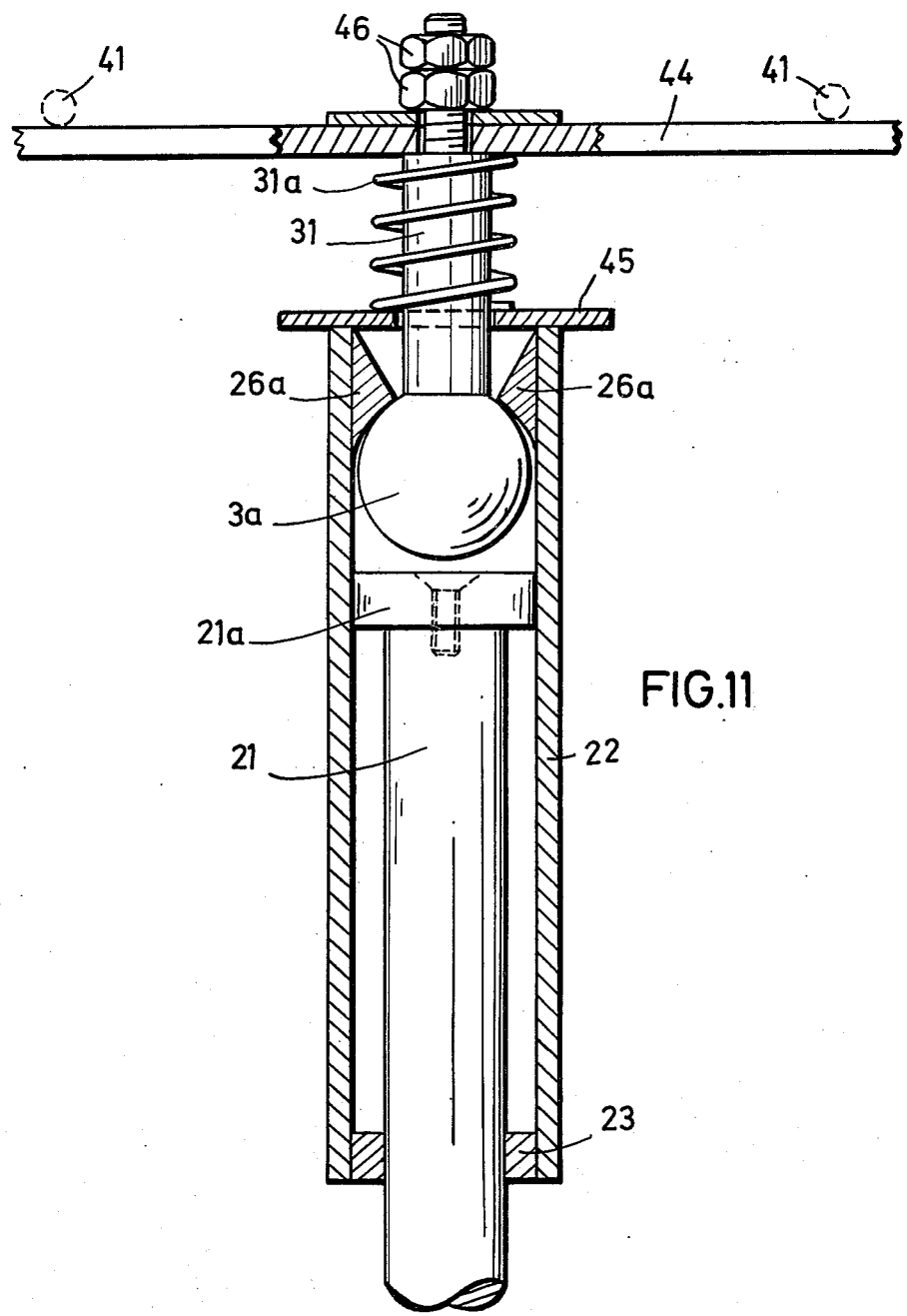
FIG. 11 is an enlarged fragmentary sectional view of an upper end portion of another upright telescopic support of this invention, and illustrates the manner in which a universal joint is housed internally of the sleeve.

Reference is now made to FIG. 11 of the drawings which illustrates another embodiment of an upper universal joint or ball-and-socket joint connection. In this case, a ball 3a is disposed in an upper end portion of the sleeve 22 and cooperates with an inner seat 26a which has an inclined lower surface (unnumbered). The ball 3a is connected with a threaded rod 31 projecting through an aperture of a plate 44 and being secured to the latter by means of nuts 46. A spring 31a is in surrounding relationship to the exposed portion of the rod 31 between a plate 45 and the plate 44 and normally biases the latter plates away from each other to bring the ball 3a into seating contact against the seat 26a. The plate 44 corresponds to the assembly plates heretofore described, and is designed to receive skids 42 of a suitable powered remote controlled helicopter.

While preferred forms and arrangements have been shown in illustrating the invention, it is to be clearly understood that various changes in details and arrangement may be made without departing from the spirit and scope of this disclosure.

I claim:

1. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, second means in the form of a universal joint connection between said upper end portion and said assembly plate whereby a model helicopter under power secured to said assembly plate is capable of roll, yaw and pitch motions, said upright telescopic support upper and lower end portions being defined respectively by a sleeve and a rod, said rod being secured to said base plate by said first connecting means, and means removably securing a portion of said second universal joint connecting means to said sleeve.

2. The apparatus as defined in claim 1 including a frame between said assembly and base plates, at least three elongated supporting members supporting said frame above said base plate and a tension spring connected between each elongated supporting member and said upright support.

3. The apparatus as defined in claim 1 including a frame between said assembly and base plates, at least three elongated supporting members supporting said frame above said base plate, a tension spring connected between each elongated supporting member and said upright support, and means for vertically adjusting the positions of said tension springs between said frame and said base plate.

4. The apparatus as defined in claim 1 including a frame between said assembly and base plates, at least three elongated supporting members supporting said frame above said base plate, a tension spring connected between each elongated supporting member and said upright support, means for vertically adjusting the positions of said tension springs between said frame and said base plate, said adjusting means being a plurality of grooves spaced along said elongated supporting members.

5. The apparatus as defined in claim 1 including an upper plate, means supporting said upper plate between said base and assembly plates, and aperture means in said upper plate through which passes said sleeve.

6. The apparatus as defined in claim 5 wherein said sleeve is tubular, said rod is in internal telescopic relationship relative to said sleeve, and said second universal joint connecting means portion is a ball.

7. The apparatus as defined in claim 6 including another rod carrying said ball, and said removable securing means secures said last-mentioned rod to said sleeve.

8. The apparatus as defined in claim 1 wherein said sleeve is tubular, said rod is in internal telescopic relationship relative to said sleeve, and said second universal joint connecting means portion is a ball.

9. The apparatus as defined in claim 8 including another rod carrying said ball, and said removable securing means secures said last-mentioned rod to said sleeve.

10. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, second means in the form of a universal joint connection between said upper end portion and said assembly plate whereby a model helicopter under power secured to said assembly plate is capable of roll, yaw and pitch motions, an upper plate, means supporting said upper plate between said base and assembly plates, aperture means in said upper plate through which passes said upright support, and said aperture means is slightly larger than the size of said upright support.

11. The apparatus as defined in claim 10 wherein said upright support is defined by a rod telescopically received in a sleeve, and adjustable stop means are provided for varying the outward length of projection of the rod relative to the sleeve.

12. The apparatus as defined in claim 10 including a frame between said upper plate and said base plate, means supporting the frame in spaced relationship to said base plate, a generally central opening in said frame, and said opening is of a size somewhat smaller than the size of said base plate.

13. The apparatus as defined in claim 10 including a frame between said upper plate and said base plate, means supporting the frame in spaced relationship to said base plate, a generally central opening in said frame, and a plurality of slots in said frame outboard and about said central opening.

14. The apparatus as defined in claim 10 including a frame between said upper plate and said base plate, means supporting the frame in spaced relationship to said base plate, a generally central opening in said frame, an annular bead of a predetermined height surrounding said circular opening, said frame including opposite edges each having a bead, and said last-mentioned beads correspond in height to said predetermined height.

15. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, and second means in the form of a universal joint connection between said upper end portion and said assembly plate whereby a model helicopter under power secured to said assembly plate is capable of roll, yaw and pitch motions, said upright support is defined by a rod and a sleeve, said rod is secured to said base plate by said first connecting means, a second rod, said second rod including a ball in part defining said second universal joint connecting means, said ball being housed within said sleeve, means connecting said second rod at an end portion thereof remote from said ball to said assembly plate, and spring means between said sleeve and assembly plate for normally biasingly urging the latter away from each other.

16. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, and second means in the form of a universal joint connection between said upper end portion and said assembly plate whereby a model helicopter under power secured to said assembly plate is capable of roll, yaw and pitch motions including an upper plate, interchangeable support means supporting said upper plate between said base and assembly plates, aperture means in said upper plate through which passes said upright support, and said first connecting means is a stationary connection between said lower end portion and said base plate.

17. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, and second means in the form of a universal joint connection between said upper end portion and said assembly plate whereby a model helicopter under power secured to said assembly plate is capable of roll, yaw and pitch motions, said first connecting means is in the form of a universal joint connection, said first universal joint connection being defined by a ball carried by said lower end portion received in a generally upwardly opening chamber of a cup-like member carried by said base plate, said cup-like member includes an inwardly directed peripheral flange, spring means biasing said ball against said flange, said flange having an uppermost outer surface, and said uppermost outer surface being disposed at an angle of generally 45 degrees to the vertical.

18. Apparatus for training remote control of a powered model helicopter comprising a base plate, a generally upright telescopic support having upper and lower end portions, first means connecting said lower end portion to said base plate, an assembly plate adapted to have a model remote controlled helicopter secured thereto, second means in the form of a universal joint connection between said upper end portion and said assembly plate whereby a model helicopter under power secured to said assembly plate is capable of roll, yaw and pitch motions including an upper plate between said base and assembly plates, a frame between said upper plate and said base plate, said upper plate being movable relative to said frame, and means supporting said frame from said base plate.

19. The apparatus as defined in claim 18 wherein said supporting means are a plurality of elongated supporting members.

20. The apparatus as defined in claim 18 wherein said supporting means are a plurality of elongated supporting members, a table plate resting upon said base plate, said elongated supporting members having threaded end portions, and said threaded end portions pass through apertures of said table plate.

21. The apparatus as defined in claim 18 aperture means in said upper plate through which passes said upright support, a plurality of elongated supporting members between said frame and base plates, and a plurality of tension springs between said elongated supporting members and said upright support.

22. The apparatus as defined in claim 18 aperture means in said upper plate through which passes said upright support, a plurality of elongated supporting members between said frame and base plates, a plurality of tension springs between said elongated supporting members and said upright support, and means for adjusting the position of said tension springs along said elongated supporting members.

23. The apparatus as defined in claim 18 aperture means in said upper plate through which passes said upright support, a plurality of elongated supporting members between said frame and base plates, a plurality of tension springs between said elongated supporting members and said upright support, means for adjusting the position of said tension springs along said elongated supporting members, and said adjusting means being a plurality of grooves spaced along said elongated supporting members.

* * * * *